(12) United States Patent
Murakami

(10) Patent No.: US 8,783,449 B2
(45) Date of Patent: Jul. 22, 2014

(54) CONVEYOR CHAIN

(75) Inventor: Yoshihiro Murakami, Osaka (JP)

(73) Assignee: Tsubakimoto Chain Co. (JP)

( * ) Notice: Subject to any disclaimer, the term of this patent is extended or adjusted under 35 U.S.C. 154(b) by 0 days.

(21) Appl. No.: 13/877,048

(22) PCT Filed: May 24, 2011

(86) PCT No.: PCT/JP2011/061810
§ 371 (c)(1),
(2), (4) Date: Mar. 29, 2013

(87) PCT Pub. No.: WO2011/148918
PCT Pub. Date: Dec. 1, 2011

(65) Prior Publication Data
US 2013/0284568 A1    Oct. 31, 2013

(30) Foreign Application Priority Data

May 28, 2010 (JP) ................................ 2010-123324

(51) Int. Cl.
*B65G 17/06* (2006.01)
(52) U.S. Cl.
USPC ............ 198/850; 198/779; 198/845; 198/847
(58) Field of Classification Search
USPC ........... 198/850, 779, 853, 847, 845; 474/206
See application file for complete search history.

(56) References Cited

U.S. PATENT DOCUMENTS

| 7,563,188 B2 * | 7/2009 | Ozaki et al. ................... 474/206 |
| 2003/0085106 A1 | 5/2003 | Corley et al. |
| 2004/0129539 A1 | 7/2004 | Corley et al. |
| 2006/0237291 A1 | 10/2006 | Ozaki et al. |

FOREIGN PATENT DOCUMENTS

| JP | H02-193805 | 7/1990 |
| JP | 2004/0129539 | 7/2003 |
| JP | 2004-262600 | 9/2004 |
| JP | 2006/0237291 | 11/2006 |

OTHER PUBLICATIONS

International Search Report prepared by the Japanese Patent Office on Aug. 9, 2011, for International Application No. PCT/JP2011/061810.
Written Opinion prepared by the Japanese Patent Office on Aug. 9, 2011, for International Application No. PCT/JP2011/061810 (English Translation Version).
International Preliminary Report on Patentability issued by WIPO on Dec. 4, 2012, for International Application No. PCT/JP2011/061810.

* cited by examiner

*Primary Examiner* — Ramya Burgess
*Assistant Examiner* — Lester Rushin
(74) *Attorney, Agent, or Firm* — Sheridan Ross P.C.

(57) ABSTRACT

Disclosed is a conveyor chain (100) in which a large number of chain links (110) on which components are loaded are linked at hinge sections by means of hinge pins (120) and in which a plurality of free rollers are provided protruding from both the front and rear surfaces of the chain links (110), wherein the plurality of free rollers are each rotationally held in roller holders to form roller units (130) and are formed so as to be attachable from the longitudinal direction in a unit attachment region of the chain links (110). By means of the aforementioned structure, it is possible to replace worn components by means of a simple operation and it is unnecessary to replace chain links (110) which have not become worn, costs are reduced, and it is simple to change the rotation direction of the free rollers.

5 Claims, 7 Drawing Sheets

CONVEYOR CHAIN

CROSS REFERENCE TO RELATED APPLICATIONS

This application is a national stage application under 35 U.S.C. 371 and claims the benefit of PCT Application No. PCT/JP2011/061810 having an international filing date of 24 May 2011, which designated the United States, and which PCT application claimed the benefit of Japanese Patent Application No. 2010-123324 filed 28 May 2010, the disclosure of which is incorporated herein by reference.

FIELD OF THE INVENTION

The present invention relates to a conveyor chain suitable for loading and conveying box-shaped or plate-shaped articles having a flat bottom surface, and in particular, to a conveyor chain in which rotatational free rollers protruding through both front and rear surfaces of chain links are held.

BACKGROUND OF THE INVENTION

Conventionally, as a conveyor chain loading and conveying articles, such a conveyor chain (a conveyor belt) has been known in which a plurality of chain links (belt modules) are provided with rotational rollers to slide and discharge the articles laterally to a conveyor line in the course of conveyance and also in which a double speed function is provided (see Patent Document 1).

This known conveyor chain is such that chain links loading and conveying articles are respectively formed at first and second members, which are put one on top of the other and united, and hinge portions thereof are connected by hinge pins. Rotating shafts of rollers are held between the first and second members in order to slide and discharge articles laterally to the conveyor line.

PRIOR ART DOCUMENTS

Patent Documents

Patent Document 1: Japanese Published Unexamined Patent Application No. 2003-182829 (Page 7, Page 8, FIG. 6 and FIG. 7)

SUMMARY OF THE INVENTION

However, the chain links are constituted of the first and second members vertically united, and the rotating shafts of the rollers are held between the first and second members in the foregoing known conveyor chain. Therefore, sliding wear occurs between the chain links or rollers and the rotating shafts of the rollers.

If the wear of the chain links, the rollers, or the rotating shafts progresses, backlash of the conveyor belt and/or a variation in the conveying level may be caused, and this makes it difficult to stably convey the articles on the rollers. Accordingly, the chain links, the rollers, or the rotating shafts need to be replaced before the wear progresses. During replacement, however, the first and second members of the chain links need to be separated to have the whole disassembled and then reassembled. Thus, the operation is disadvantageously complicated.

Moreover, when a chain link is worn out, the entire chain link needs to be replaced even if the wear progresses only in a part. Therefore, component costs disadvantageously increase. In addition, during changing of the rotation direction of the rollers as well, the first and second members of the chain links need to be separated to have the whole disassembled and then reassembled. Thus, the operation is disadvantageously complicated.

The present invention solves the foregoing conventional problems. That is, an object of the present invention is to provide a conveyor chain in which replacement of worn components is possible by a simple operation, and chain links are not worn out so that the replacement thereof becomes unnecessary, whereupon costs can be reduced, and the change operation of the rotation direction of the rollers is facilitated.

The invention according to claim 1 of the present invention is a conveyor chain including a large number of chain links into which an article loading part to be loaded with articles and a plurality of hinge portions protruding in a staggered manner from a front end edge and a rear end edge in a longitudinal direction of the chain are integrally molded, hinge pins connecting the hinge portions of the chain links, and a plurality of free rollers protruding through both front and rear surfaces of the chain links. The plurality of free rollers are rotationally held in roller holders one by one to constitute a roller unit, and the chain links have a unit mounting region provided so as for the roller unit to be mounted from the longitudinal direction of the chain, thereby solving the foregoing problems.

The conveyor chain of the invention according to claim 2 of the present invention is such that, in addition to the configuration as set forth in claim 1, the roller holder has a cylindrical circumscribing surface and the unit mounting region has a contact surface in contact with the circumscribing surface of the roller holder in a semicircle. The circumscribing surface of the roller holder and the contact surface of the unit mounting region are prevented from rotating by engagement means comprised of a protruding portion provided to one of the surfaces and a recess portion provided to the other, thereby solving the foregoing problems.

The invention according to claim 3 of the present invention is such that, in addition to the configuration as set forth in claim 2, the engagement means is comprises of an engagement protruding portion provided at one place of the contact surface of the unit mounting region and indexing recess portions provided at a plurality of places of the circumscribing surface of the roller holder, thereby solving the foregoing problems.

The invention according to claim 4 of the present invention is such that, in addition to the configuration as set forth in any one of claims 1 to 3, the circumscribing surface of the roller holder and the contact surface of the unit mounting region are retained in front and rear directions by engagement step portions respectively provided thereto, thereby solving the foregoing problems.

The invention according to claim 5 of the present invention is such that, in addition to the configuration as set forth in any one of claims 1 to 4, the unit mounting region is provided with parallel side wall surfaces extending from the contact surface to one of the end edges in the longitudinal direction of the chain, and the side wall surfaces have a pressure convex portion which retains the roller holder in the longitudinal direction of the chain, thereby solving the foregoing problems.

The invention according to claim 6 of the present invention is such that, in addition to the configuration as set forth in any one of claims 1 to 5, the hinge portions at one of the end edges of the chain links are formed in a shape following the circumscribing surface of the roller holder within the unit mounting region of an adjacent chain link, thereby solving the foregoing problems.

Effects of the Invention

The conveyor chain of the invention according to claim 1 of the present invention includes a large number of chain links into which an article loading part to be loaded with articles and a plurality of hinge portions protruding in a staggered manner from a front end edge and a rear end edge in a longitudinal direction of the chain are integrally molded, hinge pins connecting the hinge portions of the chain links, and a plurality of free rollers protruding through both front and rear surfaces of the chain links. The plurality of free rollers are rotationally held in roller holders one by one to constitute a roller unit, and the chain links have a unit mounting region provided so as for the roller unit to be mounted from the longitudinal direction of the chain. Consequently, the attachment and detachment of the free rollers to and from the chain links can be performed simply by an operation of attaching and detaching the roller units from the longitudinal direction. Therefore, when the rollers or the rotation shafts thereof are worn out, replacement of the worn components is possible by a simple operation of replacing the roller units.

Further, the chain links themselves are not worn out due to rotation of the rollers. Therefore, the chain links do not need to be replaced. Their material can be selected without restriction, and costs can be reduced.

Additionally, the change operation of the rotation direction of the free rollers can be performed easily by the operation of attaching and detaching the roller units to and from the longitudinal direction.

The invention according to claim 2 of the present invention is such that, in addition to the effect exerted by the invention according to claim 1, the roller holder has a cylindrical circumscribing surface and the unit mounting region has a contact surface in contact with the circumscribing surface of the roller holder in a semicircle, and the circumscribing surface of the roller holder and the contact surface of the unit mounting region are prevented from rotating by engagement means comprised of a protruding portion provided to one of the surfaces and a recess portion provided to the other. Therefore, the rotation direction of the free rollers can be set in multiple directions, and the rotation direction once set is not varied by an influence of vibration or the like. Articles can be conveyed smoothly, and the maintenance management of the conveyor chain is facilitated.

The invention according to claim 3 of the present invention is such that, in addition to the effect exerted by the invention according to claim 2, the engagement means is comprised of an engagement protruding portion provided at one place of the contact surface of the unit mounting region and indexing recess portions provided at a plurality of places of the circumscribing surface of the roller holder. Therefore, the rotation direction of the free rollers can be set easily and accurately, and the maintenance management of the conveyor chain is facilitated.

The invention according to claim 4 of the present invention is such that, in addition to the effect exerted by the invention according to any one of claims 1 to 3, the circumscribing surface of the roller holder and the contact surface of the unit mounting region are retained in front and rear directions by engagement step portions respectively provided thereto. Therefore, the roller unit is fixed reliably in the front and rear directions, and the height of the roller is not varied due to vibration or the like. Articles can be conveyed smoothly, and the maintenance management of the conveyor chain is facilitated.

The invention according to claim 5 of the present invention is such that, in addition to the effect exerted by the invention according to any one of claims 1 to 4, the unit mounting region is provided with parallel side wall surfaces extending from the contact surface to one of the end edges in the longitudinal direction of the chain, and the side wall surfaces have a pressure convex portion which retains the roller holder in the longitudinal direction of the chain. Therefore, the roller holder having been mounted in the unit mounting region is fixed in the longitudinal direction by the pressure convex portions, so that no unintended roller units come off at the time of attachment and detachment operations to and from the chain links. Disassembling and assembling operations in the maintenance management of the conveyor chain are facilitated.

The invention according to claim 6 of the present invention is such that, in addition to the effect exerted by the invention according to any one of claims 1 to 5, the hinge portions at one of the end edges of the chain links are formed in a shape following the circumscribing surface of the roller holder within the unit mounting region of an adjacent chain link. Therefore, clearances between the roller holders having been mounted in the unit mounting regions and the hinge portions of adjacent chain units can be rendered small, thereupon preventing foreign matter from falling off from the front side to the rear side of the conveyor chain therethrough. Moreover, since the hinge portions can restrict movement of the roller units toward the longitudinal direction of the chain, backlash of the free rollers can be reduced and articles can be conveyed smoothly.

DETAILED DESCRIPTION OF THE PREFERRED EMBODIMENTS

The present invention may be of any specific modes as long as being a conveyor chain including a large number of chain links into which an article loading part to be loaded with articles and a plurality of hinge portions protruding in a staggered manner from a front end edge and a rear end edge in a longitudinal direction of the chain are integrally molded, hinge pins connecting the hinge portions of the chain links, and a plurality of free rollers protruding through both front and rear surfaces of the chain links wherein the plurality of free rollers are rotationally held in roller holders one by one to constitute a roller unit, and the chain links have a unit mounting region provided so as for the roller unit to be mounted from the longitudinal direction of the chain, and accordingly, replacement of worn components is possible by a simple operation, and the chain links are not worn out so that the replacement thereof becomes unnecessary, whereupon costs can be reduced, and the change operation of the rotation direction of the rollers is facilitated.

Specifically, the chain links used in the conveyor chain of the present invention may have any link width according to a line width of the conveyor line. As for the dimensions of a loadable portion formed at the article loading part and the dimensions of a protruding portion of the hinge portion as well, the chain links appropriately defined according to a chain pitch or the like of the chain links can be adopted.

Further, the number of free rollers installed in the conveyor chain in its entirety may be any number. Preferably, when the free rollers are arranged so as to be at 500 to 3,000 per square meter, load applied to each free roller is small. The diameter deformation amount of free rollers due to wear and creep therefore becomes small. Breakage and deformation of the bottom portion of conveyed articles can be prevented, and stable conveyance can be enhanced.

The free rollers, the roller holders, and the rotation shafts of the free rollers may be made of any material as long as the free rollers can be held stably and rotationally.

For example, one of the sliding components is made of polyacetal, and the other is made of polyamide or polyester, thereby being excellent in self-lubricity. Furthermore, due to contact with the different materials, the friction coefficient can be rendered smaller than that of similar materials, and sliding wear can be suppressed.

Polyacetal may be any of a homopolymer, a copolymer, or a block copolymer. Polyamide may be any of nylon 6 or nylon 66, etc. Polyester may be any of polyethylene terephthalate (PET) or polybutylene terephthalate (PBT), etc.

First Embodiment

A conveyor chain of the first embodiment of the present invention will be described based on FIG. 1 to FIG. 5.

Figure 1:
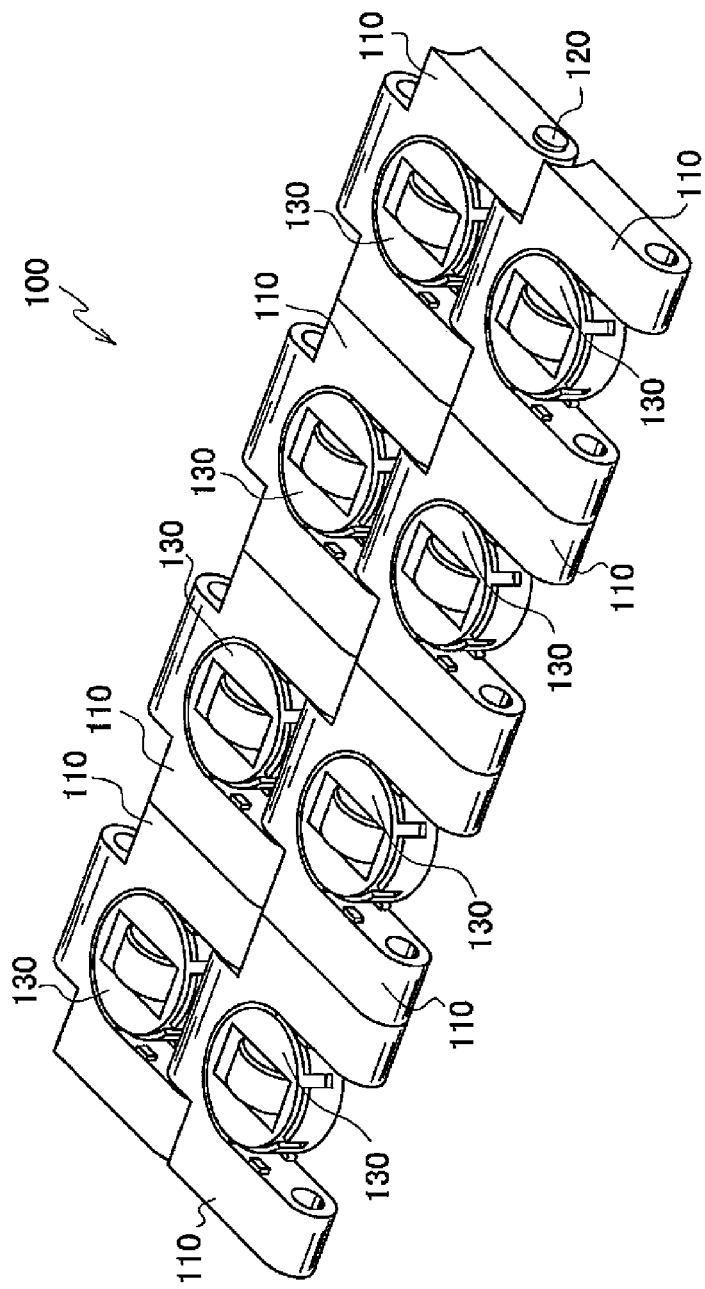
FIG. 1 is a perspective view of a conveyor chain of the first embodiment of the present invention.
Figure 2:
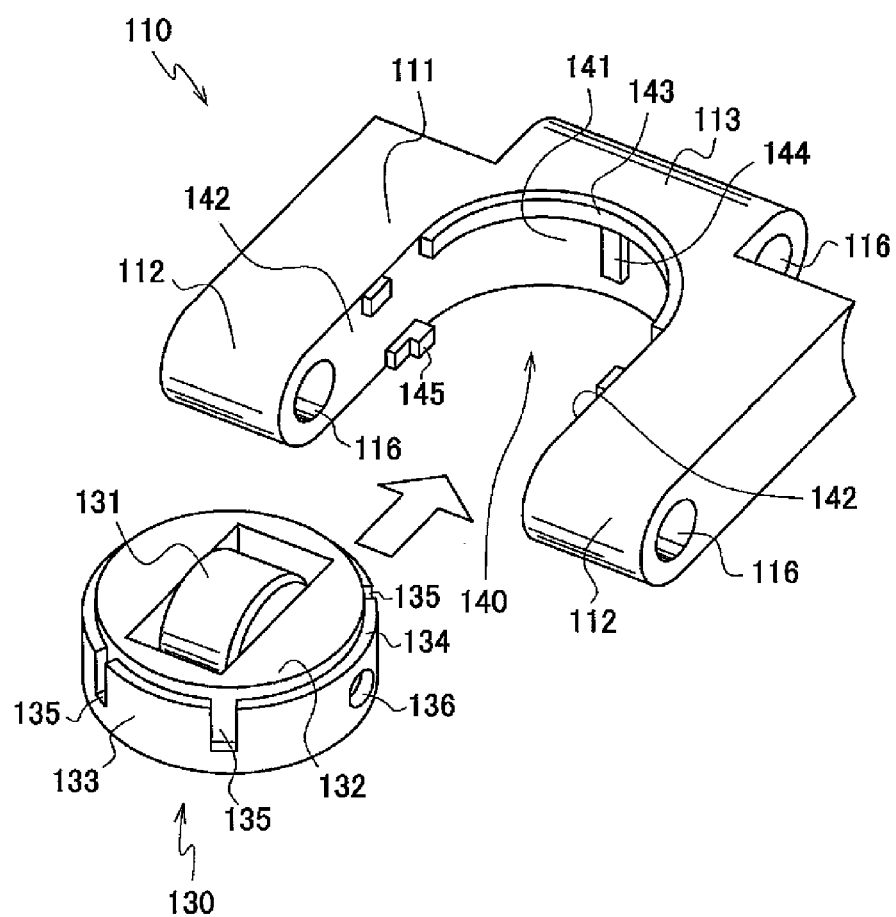
FIG. 2 is an exploded perspective view enlarging a part of the conveyor chain shown in FIG. 1.

As shown in FIG. 1 and FIG. 2, a conveyor chain 100 of the first embodiment is such that a large number of chain links 110 into which an article loading part 111 to be loaded with articles and a plurality of front hinge portions 112 and a rear hinge portion 113 protruding in a staggered manner from a front end edge and a rear end edge of the article loading part 111 are integrally molded are mutually coupled in a longitudinal direction of the chain by inserting hinge pins 120 into pin holes 116 provided to the front and rear hinge portions 112 and 113.

A unit mounting region 140 is provided between the front hinge portions 112 of the chain link 110. A free roller 131 is rotationally held in a roller holder 132 one by one to constitute a roller unit 130, which is held in the unit mounting region 140 of the chain link 110.

Where the roller units 130 are mounted in the unit mounting regions 140 and the conveyor chain 100 is assembled, the free rollers 131 protrude through both front and rear surfaces of the chain links 110, and the free rollers 131 are configured to convey box-shaped or plate-shaped articles, which have a flat bottom surface, placed on the free rollers 131.

Moreover, one chain link 110 having one unit mounting region 140 is plurally aligned in a width direction in this embodiment. However, the conveyor chain may be comprised of chain links each provided with a plurality of the unit mounting regions 140 in the width direction.

Alternatively, chain links of different widths may be abutted against each other in the width direction of the chain and coupled in the longitudinal direction of the chain as in brick laying so as for the abutted surfaces not to be aligned in the longitudinal direction of the chain.

Figure 3:
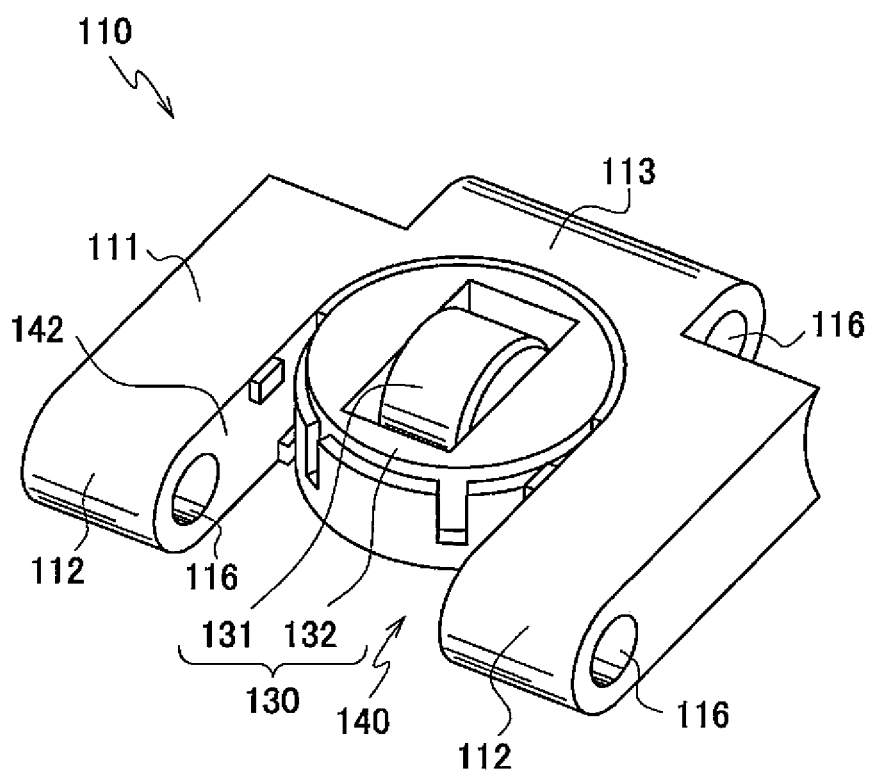
FIG. 3 is an assembled perspective view enlarging a part of the conveyor chain shown in FIG. 1.

As shown in FIG. 2 and FIG. 3, the roller holder 132 constituting the roller unit 130 has a cylindrical circumscribing surface 133. The unit mounting region 140 is formed U-shaped having a contact surface 141 in contact with the circumscribing surface 133 of the roller holder 132 in a semi-circle and parallel side wall surfaces 142 extending from the contact surface 141 to one of the end edges in the longitudinal direction of the chain, and the roller unit 130 can be attached and detached to and from the longitudinal direction of the chain.

Figure 4:
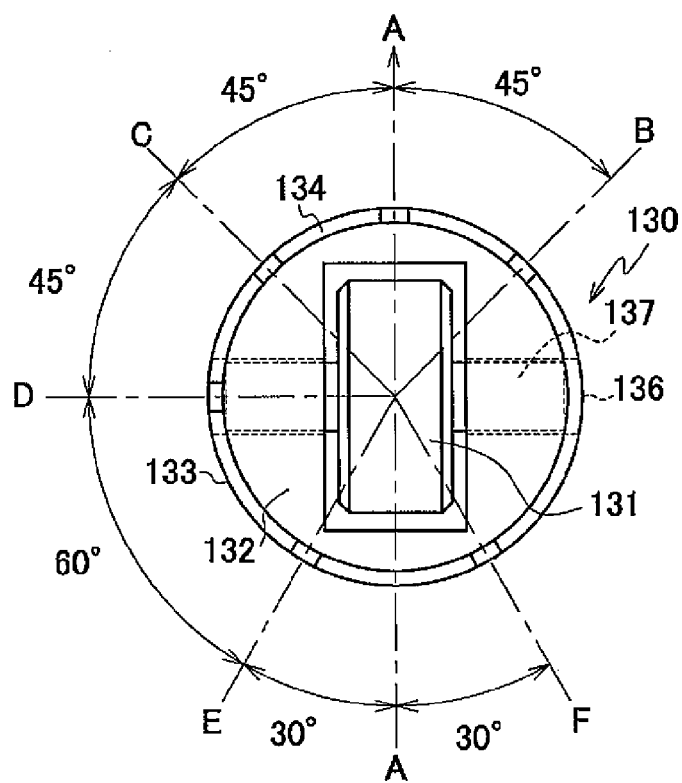
FIG. 4 is a plan view of a roller unit of the conveyor chain shown in FIG. 1.

The free roller 131 performs conveyance of articles and a conveying direction turning function and a double speed function of the articles. As shown in FIG. 2 and FIG. 4, the free roller 131 is rotationally supported by a rotating shaft 137 inserted into a rotating shaft hole 136 provided to the roller holder 132.

The rotating shaft 137 may be closely fitted with either the roller holder 132 or the free roller 131 or may be loosely fitted with the both and retained by a protruding portion or the like provided to the rotating shaft hole 136.

And, on the occasion when the free roller 131 and the rotating shaft 137 are closely fitted, the free roller 131 and the rotating shaft 137 are made of polyamide and the roller holder 132 is made of polyacetal, thereby each being excellent in self-lubricity. Furthermore, sliding parts are all in contact with the different materials, and thus the friction coefficient can be rendered smaller than that of similar materials and sliding wear can be suppressed.

The contact surface 141 of the unit mounting region 140 has an innermost part provided with an engagement protruding portion 144. The circumscribing surface 133 of the roller holder 132 is provided with a plurality of indexing recess portions 135. The engagement protruding portion 144 and the indexing recess portion 135 are configured to be engaged with each other and prevented from rotating when the roller unit 130 is mounted.

Further, the indexing recess portions 135 are provided at every predetermined angle as shown in FIG. 4, whereupon the rotation direction of the free roller 131 can be set accurately.

Figure 5:
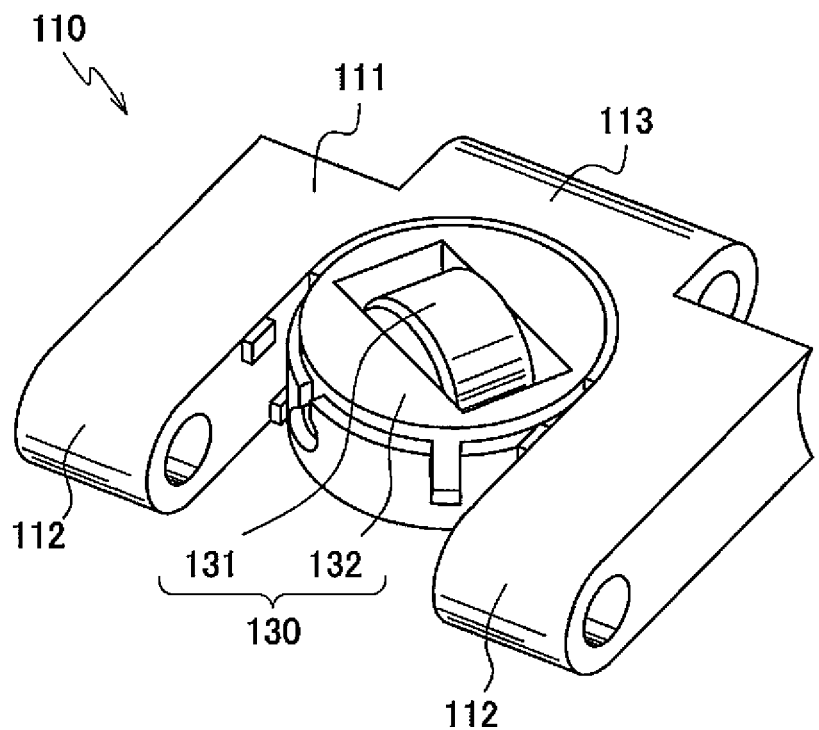
FIG. 5 is an assembled perspective view in which the angle of the roller unit shown in FIG. 3 is changed.

For example, articles in the course of conveyance can be discharged laterally to the conveyor line by mounting the roller unit 130 in such a manner that the rotation direction of the free roller 131 forms an angle with respect to a chain running direction as shown in FIG. 5.

In the example shown in FIG. 4, the respective indexing recess portions 135 are provided in the A direction which is the rotation direction of the free roller 131, B direction and C direction of 45 degrees to each right and left side from the A direction, D direction of 90 degrees from the A direction, and the E direction and F direction of 30 degrees to each left and right side from the A direction. However, the direction and the number of the indexing recess portions 135 may be defined optionally according to necessity.

Engagement step portions 134 and 143 are respectively provided to upper end portions of the circumscribing surface 133 of the roller holder 132 and the contact surface 141 of the unit mounting region 140, and retain the roller holder 132 in the front direction.

The side wall surface 142 of the unit mounting region 140 has a lower end portion having a pressure convex portion 145 which retains the roller holder 132 in the longitudinal direction of the chain when the roller holder 132 is mounted. The pressure convex portion 145 fixes the roller holder 132 having been mounted in the unit mounting region 140 in the longitudinal direction of the chain.

An engagement step portion similar to the one at the upper end portion of the circumscribing surface 133 of the roller holder 132 is provided at the lower end portion as well. The pressure convex portions 145 are engaged with the engagement step portion at the lower end portion of the circumscribing surface 133, thereby fixing the roller holder 132 in the longitudinal direction of the chain and also retaining the roller holder 132 in the rear direction.

Functions and effects of the thus configured conveyor chain 100 will be described.

In assembling the conveyor chain 100, the roller units 130 are first mounted in corresponding unit mounting regions 140 of the chain links 110 from the longitudinal direction of the chain in such a manner so as to get over the pressure convex portions 145 and to be pushed in.

The mounted roller units 130 are fixed in the front and rear directions due to that the engagement step portions 143 and pressure convex portions 145 of the side wall surfaces 142 of the unit mounting regions 140 are engaged with the upper and lower engagement step portions 134 of the circumscribing surfaces 133 of the roller holders 132, and are fixed in the longitudinal direction of the chain by getting over the pressure convex portions 145. Consequently, the roller units 130 are integrated without escaping from the corresponding chain links 110. Further, the engagement protruding portions 144 and the indexing recess portions 135 are engaged and prevented from rotating at this time, so that the rotation direction of the free rollers 131 is set accurately.

Then, the respective chain links 110 are aligned in the width and longitudinal directions, and the hinge pins 120 are inserted into the pin holes 116, and the conveyor chain 100 is assembled.

At this time, the roller units 130 are integrated without escaping from the corresponding chain links 110, so that the assembling operation is significantly facilitated.

Furthermore, the roller units 130 are securely fixed, and the height, position, or rotation direction of the rollers is not varied due to an influence of vibration or the like. The articles can be conveyed smoothly, and the maintenance management of the conveyor chain 100 is facilitated.

Moreover, if a need to replace each free roller 131 due to damage or wear arises, the conveyor chain 100 is disassembled in a procedure reverse to the above. The entire roller unit 130 is replaced, and the conveyor chain 100 is reassembled.

Every free roller 131 is not necessarily damaged or worn out uniformly by various factors such as the shape of conveyed articles and the conveyed position thereof in the width direction. The disassembling operation at the time of the above replacement can be performed only by pulling out the hinge pin 120 to the position where the unit mounting region 140 of the chain link 110 in which the roller unit 130 which requires replacement is mounted is opened. The replacement of worn components is possible by a simple operation.

In changing the rotation direction of the free rollers 131 as well, the foregoing disassembling operation is performed. The roller unit 130 is detached from the longitudinal direction, and the rotation direction thereof is changed. After that, the assembling operation is repeated sequentially. There is no need to simultaneously position or temporarily fasten a plurality of components, and the changing of the rotation direction can be performed easily.

Second Embodiment

Figure 6:
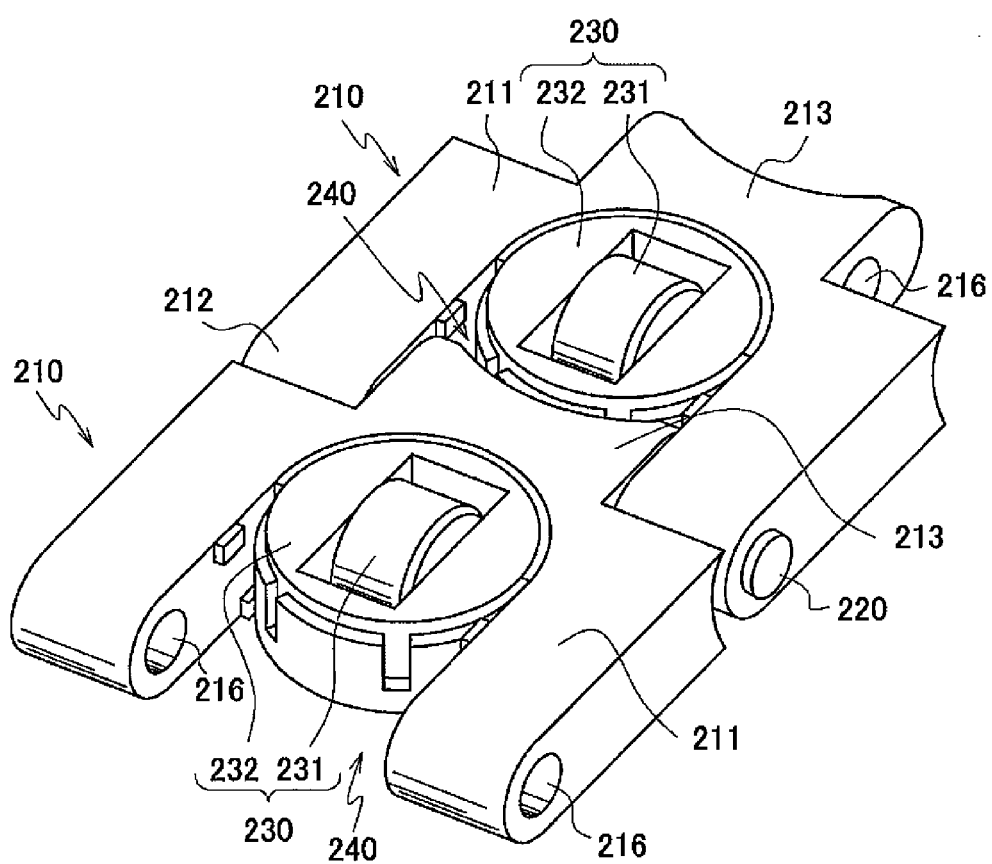
FIG. 6 is a partially enlarged perspective view of a conveyor chain of the second embodiment of the present invention.
Figure 7:
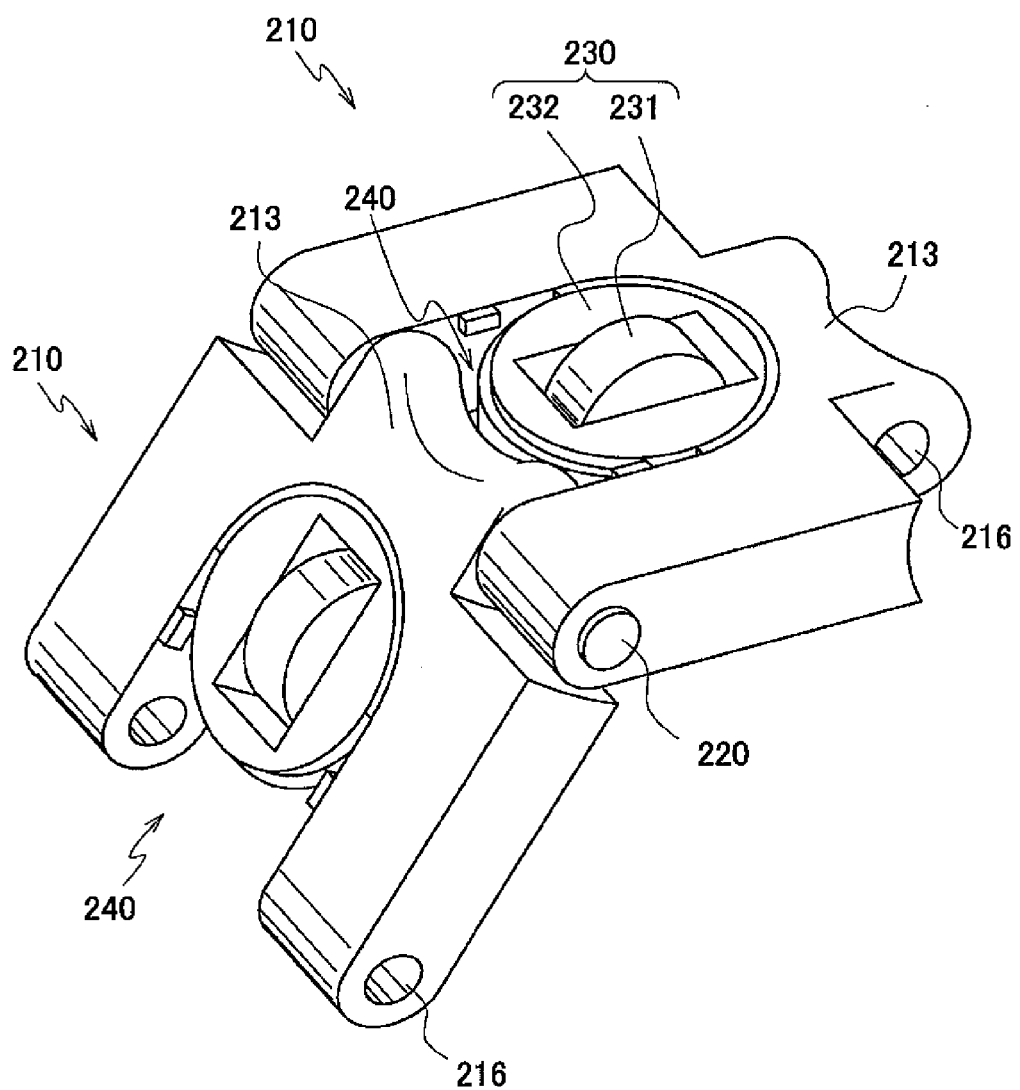
FIG. 7 is a perspective view at the time when the conveyor chain shown in FIG. 6 is bent.

As shown in FIG. 6 and FIG. 7, a conveyor chain 200 of the second embodiment of the present invention is such that rear hinge portions 213 of a large number of chain links 210 each have an end portion formed into a shape following a circumscribing surface 233 of a roller holder 232 within an unit mounting region 240 of an adjacent chain link 210. Other configurations are the same as those of the first embodiment.

The shape of the rear hinge portions 213 allows a clearance between the roller holder 232 having been mounted in the unit mounting region 240 and the rear hinge portion 213 of the adjacent chain link 210 to be small. The shape is also capable of preventing foreign matter from falling off from the front side to the rear side of the conveyor chain 200 therethrough. Also, since the rear hinge portions 213 can restrict movement of the roller units 230 toward the longitudinal direction of the chain, backlash of the free rollers 231 can be reduced and articles can be conveyed smoothly.

According to the conveyor chains of the present invention as described above, effects thereof are significant such as the replacement of worn components is possible by a simple operation, and the chain links are not worn out so that the replacement thereof becomes unnecessary, whereupon costs can be reduced, and the change operation of the rotation direction of the rollers is facilitated.

DESCRIPTION OF SYMBOLS

100 . . . conveyor chain
110, 210 . . . chain link
111, 211 . . . article loading part
112, 212 . . . front hinge portion
113, 213 . . . rear hinge portion
116, 216 . . . pin hole
120, 220 . . . hinge pin
130, 230 . . . roller unit
131, 231 . . . free roller
132, 232 . . . roller holder
133 . . . circumscribing surface
134 . . . engagement step portion
135 . . . indexing recess portion
136 . . . rotating shaft hole
137 . . . rotating shaft
140, 240 . . . unit mounting region
141 . . . contact surface
142 . . . side wall surface
143 . . . engagement step portion
144 . . . engagement protruding portion
145 . . . pressure convex portion

The invention claimed is:

1. A conveyor chain comprising:
a large number of chain links into which an article loading part to be loaded with articles and a plurality of hinge portions protruding in a staggered manner from a front end edge and a rear end edge in a longitudinal direction of the chain are integrally molded;
hinge pins connecting the hinge portions of the chain links; and
a plurality of free rollers protruding through both front and rear surfaces of the chain links,
wherein the plurality of free rollers are rotationally held in roller holders one by one to constitute a roller unit,
the chain links have a unit mounting region providing for the roller unit to be mounted from the longitudinal direction of the chain,
the roller holder has a cylindrical circumscribing surface,
the unit mounting region has a contact surface in contact with the circumscribing surface of the roller holder in a semicircle, and the circumscribing surface of the roller holder and the contact surface of the unit mounting region are prevented from rotating by an engagement apparatus comprised of a protruding portion provided on one of the surfaces and a recess portion provided on the other.

2. The conveyor chain according to claim 1, wherein the engagement apparatus is comprised of an engagement protruding portion provided at one place of the contact surface of the unit mounting region and indexing recess portions provided at a plurality of places of the circumscribing surface of the roller holder.

3. The conveyor chain according to claim 1, wherein the circumscribing surface of the roller holder and the contact surface of the unit mounting region are retained in front and rear directions by engagement step portions provided thereto.

4. The conveyor chain according to claim 1, wherein
the unit mounting region is provided with parallel side wall surfaces extending from the contact surface to one of the end edges in the longitudinal direction of the chain, and
the side wall surfaces have a pressure convex portion which retains the roller holder in the longitudinal direction of the chain.

5. The conveyor chain according to claim 1, wherein the hinge portions at one of the end edges of the chain links are formed in a shape following the circumscribing surface of the roller holder within the unit mounting region of an adjacent chain link.

* * * * *